H. G. DOELLINGER.
STRIPING MACHINE.
APPLICATION FILED JULY 18, 1918.
1,331,325.
Patented Feb. 17, 1920.
2 SHEETS—SHEET 1.
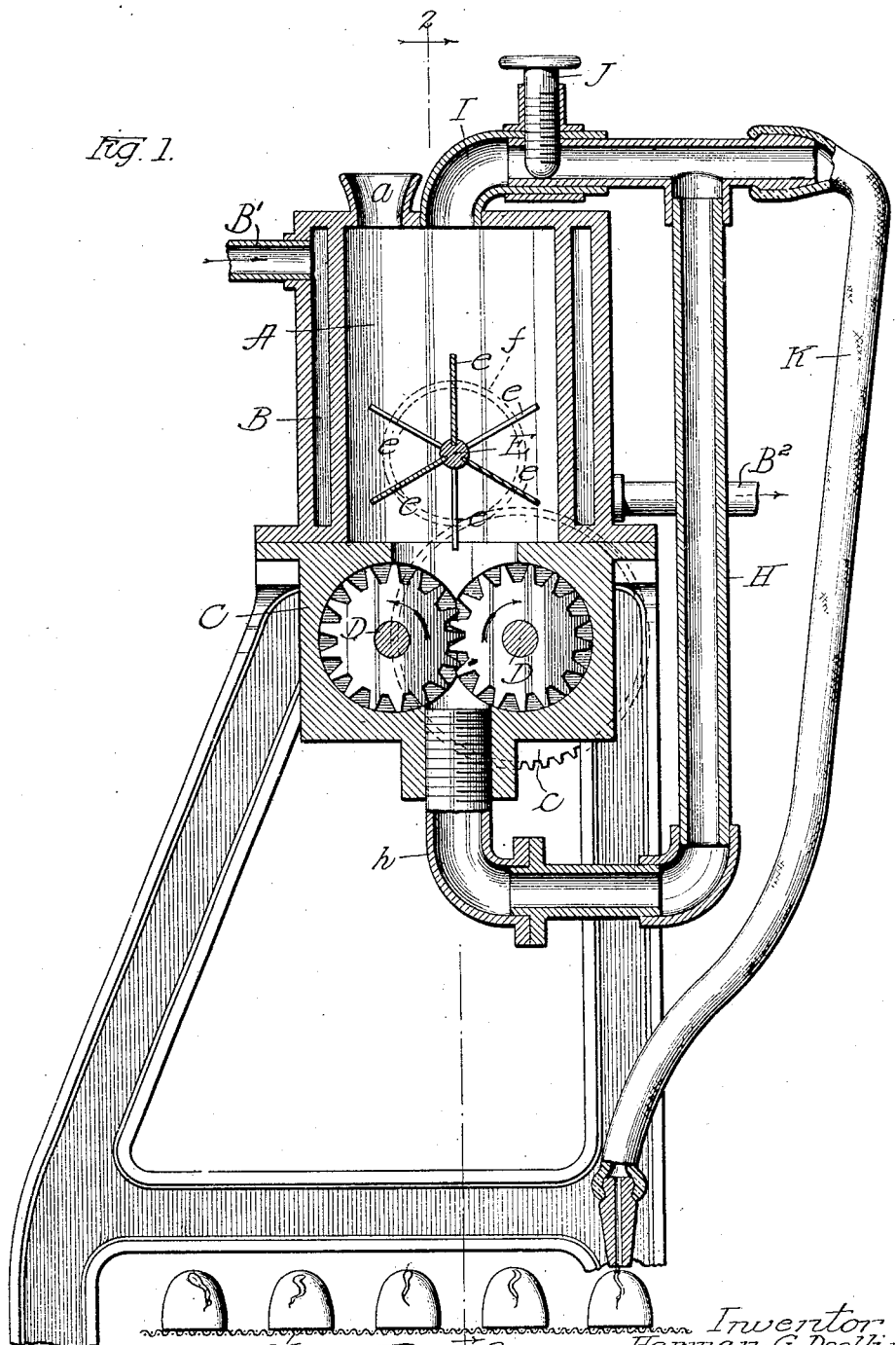
Inventor
Herman G. Doellinger
By Franks Thomason Atty.

H. G. DOELLINGER.
STRIPING MACHINE.
APPLICATION FILED JULY 18, 1918.
1,331,325.
Patented Feb. 17, 1920.
2 SHEETS—SHEET 2.
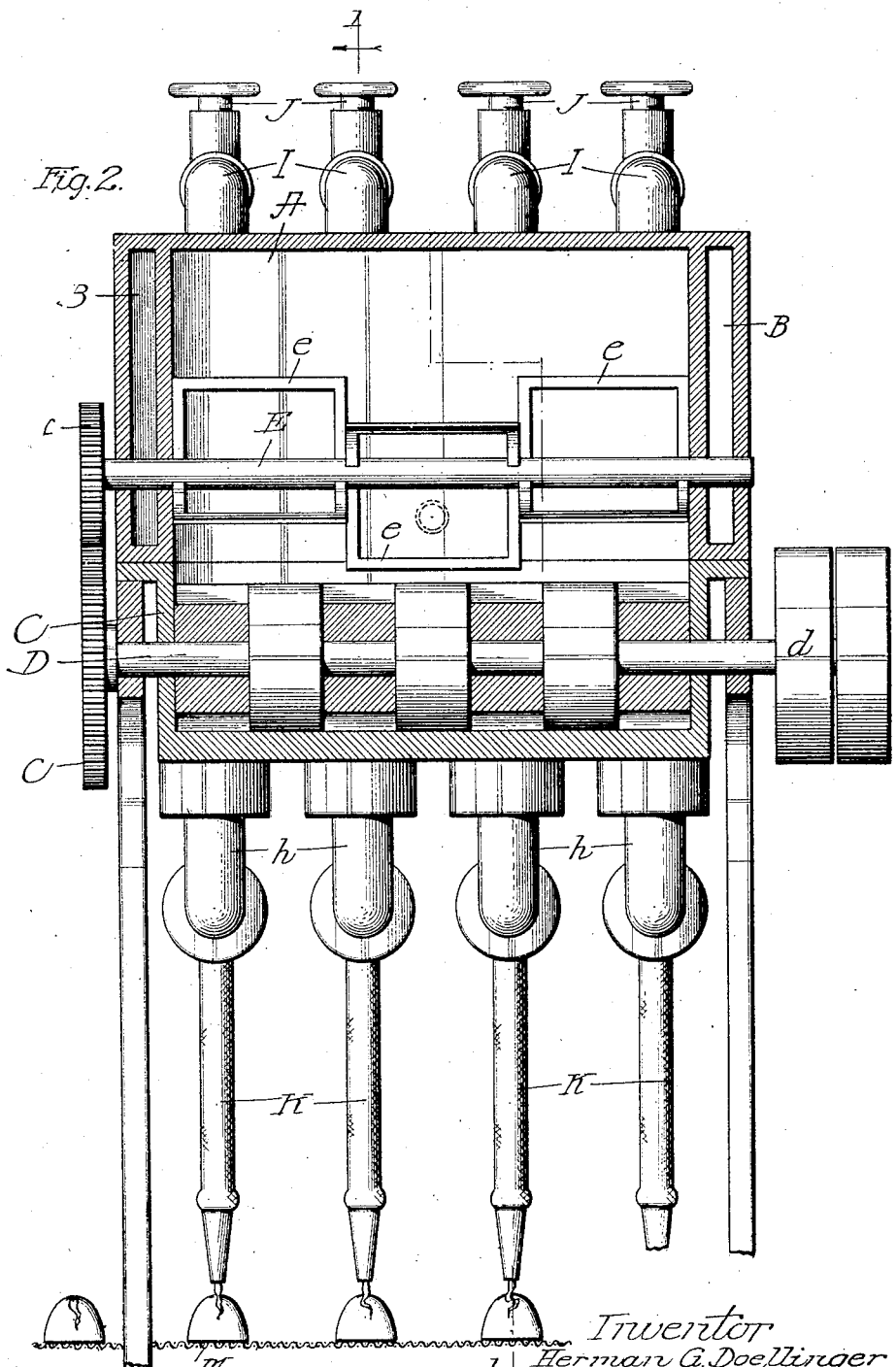

UNITED STATES PATENT OFFICE.

HERMAN G. DOELLINGER, OF DAVENPORT, IOWA, ASSIGNOR TO HALLIGAN CANDY COMPANY, OF DAVENPORT, IOWA, A CORPORATION OF IOWA.

STRIPING-MACHINE.

1,331,325.       Specification of Letters Patent.      Patented Feb. 17, 1920.

Application filed July 18, 1918. Serial No. 245,486.

*To all whom it may concern:*

Be it known that I, HERMAN G. DOELLINGER, a citizen of the United States, residing at Davenport, in the county of Scott and State of Iowa, have invented new and useful Improvements in Striping-Machines, of which the following is a full, clear, and exact description.

My invention relates to machines for decorating chocolate creams and bonbons, and particularly the machine for which Letters Patent of the United States were granted to me March 5, 1918, No. 1,258,322.

In machines of the kind above specified, the liquid chocolate is fed to pumps that force the same through the striping devices and this chocolate is obtained from the same source as the chocolate in which the blanks are dipped or sprayed. This chocolate is thin and soft, and when it issues from the striping devices it is so thin and hot that it merges into the chocolate coating on the blanks and practically disappears or at least produces a very vague effect.

It is the object of my invention to overcome this objection, and to make the design produced by the striping stand out distinct and clear on the blanks without requiring the expenditure of any more time or labor. This I accomplish by the means hereinafter fully described, and as particularly pointed out in the claims.

In the drawings:

Figure 1 is a vertical longitudinal section through the portion of a striping machine embodying my improvements.

Fig. 2 is a transverse section taken on line 2—2, Fig. 1.

In the accompanying drawings, A represents an inverted rectangular box-shaped hopper or tank, the closed upper end of which has a suitable inlet opening *a* through which hot liquid chocolate may be poured into it. The side-walls of this tank are provided with a water jacket B which reduces the temperature of the chocolate therein and makes it thicker, and the lower edges of said tank are provided with outwardly projecting flanges to enable it to be mounted upon and connected to corresponding flanges projecting from the upper edges of a rectangular casing C in which a series of rotary gang pumps operate. The water jacket B is provided with the inlet and outlet pipes B' and B² through which the cooling medium is led into and out of the water jacket B.

This gang pump mechanism is fully described in Letters Patent of the United States granted to me March 5, 1918, No. 1,258,322, and a detailed description herein of this mechanism is, therefore, considered unnecessary. It is sufficient to state that the ends of one or both of the parallel pump shafts D, D, extend through their bearings in the end of this casing, and at one end the driven shaft is provided with a pulley *d* through the medium of which said shafts are driven and at the other end one of said shafts is provided with a comparatively large gear *c*.

The tank is provided, preferably, midway between its sides and near the bottom thereof with a longitudinally extending shaft E, and this shaft is provided with one or more series of open paddles *e*. These series each comprise three or four equi-distant paddles, and where more than one series is used the paddles of one series are stepped or alternated with those of the other series. This shaft E has one of its ends extended through its bearings in the end of the tank and is provided with a small gear or pinion *f* that meshes with large gear *c* and derives motion therefrom.

The pump casing has discharge pipes *h* leading from the underside thereof, and these discharge pipes are connected by vertical pipes H with rearwardly extending pipes I that lead to and discharge into the upper end of the tank. Between the upper end of pipes H and the ends that discharge into the tank, pipes I are provided with valves J that screw vertically down into and close the bores thereof or control the flow of chocolate back into the tank. The forward ends of pipes I are suitably constructed to permit the ends of flexible pipes K to be attached thereto, and the lower ends of pipes K are provided with nozzles that are adapted to be manipulated by operators to stripe or decorate the chocolate blanks as they travel past on the wire apron M that travels longitudinally under the pump casing.

What I claim as new is:

1. In a device of the class described the combination of a receptacle for containing coating material for confections, a pump, a passage leading from the pump through which the coating material from the pump is discharged, a tubular connection connected with said passage, one end of said tubular connection being connected with the receptacle and the opposite end thereof being provided with a flexible connection whereby the coating material may be discharged from the passage.

2. In a machine of the class described, the combination of a receptacle for containing coating material for confections, a pump, a passage connected with the pump through which the coating material from said pump is discharged, a tube connected with the passage, one end of the tube having a connection with the receptacle, a flexible connection attached to the opposite end of said tube, and a jacket surrounding said receptacle.

3. In a machine of the class described, the combination of a receptacle for containing coating material for confections, a pump, a passage connected with the pump through which the coating material from the pump is discharged, a tube connected with the passage, one end of the tube having a connection with the receptacle, a valve provided at said end, a flexible connection attached to the opposite end of said tube, and a jacket surrounding the receptacle.

4. In a machine of the class described, the combination of a receptacle for containing coating material for confections, stirring devices arranged in the receptacle, a pump, a passage leading from the pump through which the coating material from the pump is discharged, a tube connected with the passage, one end of the tube having a connection with the receptacle, a flexible connection attached to the opposite end of said tube and a jacket surrounding the receptacle.

5. In a machine of the class described, the combination of a receptacle for containing coating material for confections, stirring devices arranged in the receptacle, a pump, a passage leading from the pump through which the coating material from the pump is discharged, a tube connected with the passage, one end of the tube having a connection with the receptacle, a valve arranged between the discharge passage from the pump and the receptacle, a flexible connection leading from the opposite end of the tube and a jacket surrounding the receptacle.

In witness whereof I have hereunto set my hand this 10th day of June, 1918.

HERMAN G. DOELLINGER.

Witnesses:
A. STAAK,
LOUIS W. BEIN.